(12) United States Patent
Takaki (10) Patent No.: US 12,427,651 B2
(45) Date of Patent: Sep. 30, 2025

(54) PARALLEL LINK MECHANISM AND LINK OPERATION DEVICE

(71) Applicant: NTN CORPORATION, Osaka (JP)

(72) Inventor: Toshiki Takaki, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/609,179

(22) Filed: Mar. 19, 2024

(65) Prior Publication Data

US 2024/0217094 A1    Jul. 4, 2024

Related U.S. Application Data (63) Continuation of application No. PCT/JP2022/034959, filed on Sep. 20, 2022.

(30) Foreign Application Priority Data

Sep. 27, 2021    (JP) .................................. 2021-156840

(51) Int. Cl.
*B25J 9/00*    (2006.01)
*B25J 9/16*    (2006.01)

(52) U.S. Cl.
CPC ........... *B25J 9/0048* (2013.01); *B25J 9/1623* (2013.01)

(58) Field of Classification Search
CPC ............................. B25J 9/0048; B25J 9/1623
See application file for complete search history.

(56) References Cited

U.S. PATENT DOCUMENTS

| | | | |
|---|---|---|---|
| 5,893,296 A * | 4/1999 | Rosheim | G05G 5/03 74/490.03 |
| 5,971,701 A | 10/1999 | Kawamura et al. | |
| 6,077,027 A | 6/2000 | Kawamura et al. | |
| 7,472,622 B2 * | 1/2009 | Isobe | B25J 17/0266 901/29 |
| 7,478,576 B2 * | 1/2009 | Rosheim | B25J 17/0266 901/29 |
| 9,746,037 B2 | 8/2017 | Sone et al. | |
| 9,821,454 B2 * | 11/2017 | Isobe | F16H 21/46 |
| 10,406,677 B2 | 9/2019 | Isobe et al. | |
| 10,828,779 B2 * | 11/2020 | Marui | B25J 19/0095 |

(Continued)

FOREIGN PATENT DOCUMENTS

| | | |
|---|---|---|
| JP | 6-50402 | 2/1994 |
| JP | 9-219431 | 8/1997 |
| JP | 2000-94245 | 4/2000 |

(Continued)

*Primary Examiner* — Bobby Rushing, Jr.

(57) ABSTRACT

In a parallel link mechanism, a distal end side link hub is coupled to a proximal end side link hub via three link mechanisms such that a posture of the distal end side link hub can be changed relative to the proximal end side link hub. Each link mechanism includes a proximal side end link member rotatably coupled at one end thereof to the proximal end side link hub, a distal side end link member rotatably coupled at one end thereof to the distal end side link hub, and a center link member rotatably coupled at both ends thereof to other ends of the proximal and distal side end link members via both revolute pair sections. The parallel link mechanism includes a rotation transmission mechanism configured to allow rotation of one revolute pair section to rotate the other revolute pair section in reverse.

7 Claims, 11 Drawing Sheets

(56) References Cited

U.S. PATENT DOCUMENTS

2014/0227023 A1  8/2014  Sone et al.
2017/0014994 A1  1/2017  Isobe et al.

FOREIGN PATENT DOCUMENTS

| JP | 2013-76427 | 4/2013 | |
|---|---|---|---|
| JP | 2015-194207 | 11/2015 | |
| JP | 6289973 | 3/2018 | |
| JP | 6648246 B1 * | 2/2020 | ............ B25J 9/0048 |

* cited by examiner

PRIOR ART

PARALLEL LINK MECHANISM AND LINK OPERATION DEVICE

CROSS REFERENCE TO THE RELATED APPLICATION

This application is a continuation application, under 35 U.S.C. § 111(a) of international patent application No. PCT/JP2022/034959, filed Sep. 20, 2022, which claims priority to Japanese patent application No. 2021-156840, filed Sep. 27, 2021, the entire disclosures of all of which are herein incorporated by reference as a part of this application.

BACKGROUND OF THE INVENTION

Field of the Invention

The present invention relates to a parallel link mechanism and a link actuating device to be used, for example, in equipment that requires a precise and wide operating range such as medical equipment and industrial equipment.

Description of Related Art

Patent Document 1 discloses a work device that performs predetermined work by a parallel link mechanism that includes a base plate and a traveling plate, couples these plates by a plurality of links, and moves the traveling plate by coordinated operation of these links.

Figure 12:
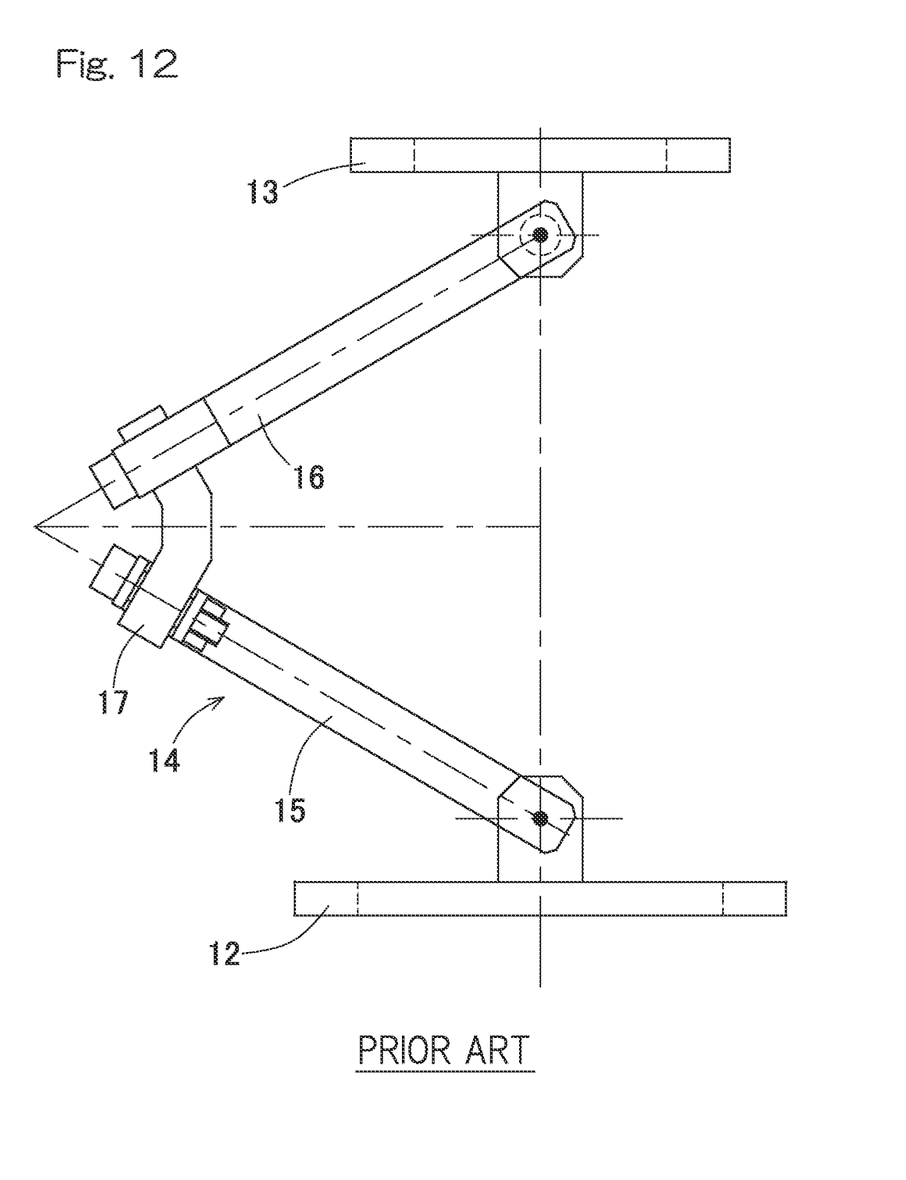
FIG. 12 is a front view of a parallel link mechanism of a conventional example.

In the parallel link mechanism of Patent Document 2, as shown in FIG. 12, a proximal end side link hub 12, a distal end side link hub 13, and three or more link mechanisms 14 form a two-degrees-of-freedom mechanism in which the distal end side link hub 13 is rotatable about two mutually orthogonal axes, relative to the proximal end side link hub 12.

RELATED DOCUMENT

Patent Document

[Patent Document 1] JP Laid-open Patent Publication No. 2000-094245
[Patent Document 2] JP Patent No. 6289973

In the parallel link mechanism of Patent Document 1, the operating angle of each link is small. Therefore, it is necessary to increase the link length in order to set the operating range of the travelling plate to be large. Accordingly, the dimensions of the entire mechanism are increased, causing a problem that the size of the device is increased. In addition, when the link length is increased, the rigidity of the entire mechanism is reduced.

In the parallel link mechanism of Patent Document 2, theoretically, for both revolute pair sections each composed of a center link member 17 and an end link member 15 or 16, there is a restriction condition (rotation restriction condition for the center link member 17) that when one revolute pair section rotates, the other revolute pair section rotates in reverse by the same amount and the rotation is fixed.

However, in the actual parallel link mechanism, there are machining errors in components and the rigidity of bearings may be low. Accordingly, in Patent Document 2, the central axis of each revolute pair section does not intersect each of distal and proximal end side spherical link centers at a single point, and the conditions are different from those of the theoretical parallel link mechanism. Thereby, the rotation restriction condition is not always satisfied. Since the rotation restriction condition for the center link member is not satisfied, the rotation angles of both revolute pair sections each composed of the center link member and the end link member are not fixed. As a result, the rigidity of the entire mechanism is reduced.

SUMMARY OF THE INVENTION

An object of the present invention is to provide a parallel link mechanism and a link actuating device that are capable of improving the rigidity of the entire mechanism while achieving downsizing.

A parallel link mechanism of the present invention includes: a proximal end side link hub; a distal end side link hub; and three or more link mechanisms which couples the distal end side link hub to the proximal end side link hub such that a posture of the distal end side link hub can be changed relative to the proximal end side link hub. Each of the link mechanisms is a spherical link mechanism including: a proximal side end link member rotatably coupled at one end thereof to the proximal end side link hub; a distal side end link member rotatably coupled at one end thereof to the distal end side link hub; and a center link member rotatably coupled at both ends thereof to other ends of the proximal and distal side end link members via both revolute pair sections, respectively. The parallel link mechanism further includes a rotation transmission mechanism which allows rotation of either one revolute pair section to rotate the other revolute pair section in reverse with respect to the one revolute pair section.

With this configuration, the proximal end side link hub, the distal end side link hub, and the three or more link mechanisms form a two-degrees-of-freedom mechanism in which the distal end side link hub is rotatable about two mutually orthogonal axes, relative to the proximal end side link hub. In other words, the proximal end side link hub, the distal end side link hub, and the three or more link mechanisms form a mechanism that allows the distal end side link hub to rotate with two degrees of freedom to change its posture, relative to the proximal end side link hub. This two-degrees-of-freedom mechanism is compact in size, and also, can achieve a wide range of movement for the distal end side link hub relative to the proximal end side link hub.

The parallel link mechanism includes a rotation transmission mechanism at both revolute pair sections including the proximal and distal side end link members and both ends of the center link member, and the rotation transmission mechanism allows rotation of either one revolute pair section to rotate the other revolute pair section in reverse with respect to the rotation of the one revolute pair section. Therefore, the amount of rotation of the other revolute pair section is uniquely determined by the rotation of the one revolute pair section, which satisfies a rotation restriction condition for the parallel link mechanism. Thus, deformation of the parallel link mechanism is suppressed, and the rigidity of the entire mechanism is improved as compared to the parallel link mechanism of the conventional art in which the rotation restriction condition is not satisfied.

The rotation transmission mechanism may rotate the other revolute pair section in reverse with respect to the one revolute pair section by the same amount of rotation. In this case, the design and the structure of the rotation transmission mechanism can be simplified, and the manufacturing cost of the rotation transmission mechanism can be reduced.

The rotation transmission mechanism may include gears provided at a rotation shaft of the revolute pair section of the proximal side end link member and the center link member and a rotation shaft of the revolute pair section of the distal side end link member and the center link member, and the gears rotate around the respective rotation shafts and mesh with each other. In this case, the rotation of the one revolute pair section can be accurately transmitted to the other revolute pair section.

The gears may be bevel gears. When an angle formed by the central axis of the revolute pair section of the center link member and the proximal side end link member and the central axis of the revolute pair section of the center link member and the distal side end link member is specified as a determined angle, the rotation of the one revolute pair section can be accurately transmitted to the other revolute pair section by the bevel gears.

The gears provided at the respective rotation shafts may be gears having the same shape. In this case, components (gears) can be used for either, and the manufacturing cost of the rotation transmission mechanism can be reduced.

The rotation transmission mechanism may include a wire body, one end of which is wound around a rotation shaft member having a central axis which is a rotation axis of the revolute pair section of the proximal side end link member and the center link member; another end of the wire body may be wound in a direction opposite to that of the one end around a rotation shaft member having a central axis which is a rotation axis of the revolute pair section of the distal side end link member and the center link member; and the rotation shaft members may be connected to each other by the wire body. The wire body is, for example, a wire rope, a belt, a chain, or the like. With this configuration, for example, by providing the wire body to an existing parallel link mechanism, the rotation of one revolute pair section can be accurately transmitted to another revolute pair section.

A link actuating device of the present invention includes: the parallel link mechanism having any of the above configurations of the present invention; and a posture control actuator provided at each of two or more link mechanisms of the three or more link mechanisms and configured to arbitrarily control the posture of the distal end side link hub. Therefore, the above-described effects of the parallel link mechanism of the present invention can be achieved. By the posture control actuator, the posture of the distal end side link hub relative to the proximal end side link hub can be determined.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

First Embodiment

A parallel link mechanism, according to a first embodiment of the present invention, using a spherical link mechanism will be described with reference to FIG. 1A to FIG. 5.

Figure 1A:
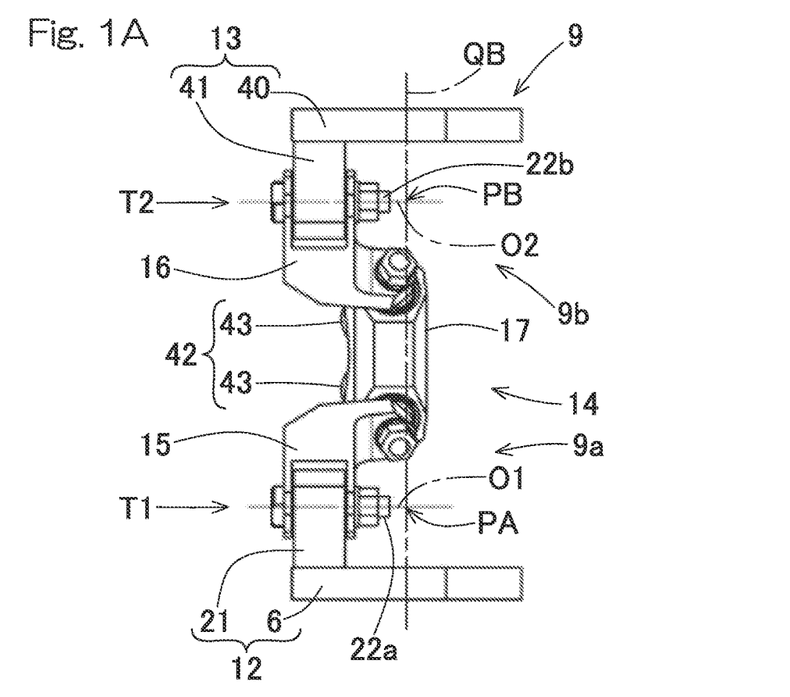
FIG. 1A is a side view of a parallel link mechanism according to a first embodiment of the present invention, wherein a part thereof is omitted.
Figure 1B:
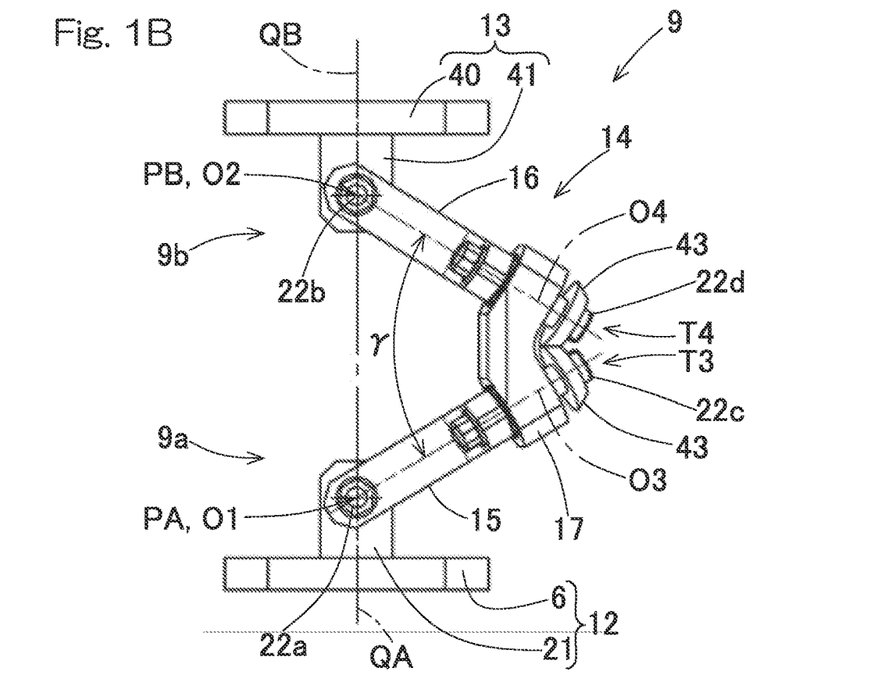
FIG. 1B is a front view of the parallel link mechanism, wherein a part thereof is omitted.

As shown in FIG. 1A, a parallel link mechanism 9 couples a distal end side link hub 13 to a proximal end side link hub 12 via three link mechanisms 14 such that the posture of the distal end side link hub 13 can be changed relative to the proximal end side link hub 12. The number of link mechanisms 14 may be four or more. In FIG. 1A and FIG. 1B, only one link mechanism 14 is shown, and the other two link mechanisms are omitted.

As shown in FIG. 1B, each link mechanism 14 includes a proximal side end link member 15, a distal side end link member 16, and a center link member 17, and forms a quadric chain link mechanism composed of four revolute pairs.

As shown in FIG. 1A, the proximal and distal side end link members 15 and 16 each have a substantially L-shape. The proximal side end link member 15 shown in FIG. 1B is coupled at one end thereof to the proximal end side link hub 12 so as to be rotatable around a first rotation shaft 22a. The distal side end link member 16 is coupled at one end thereof to the distal end side link hub 13 so as to be rotatable around a second rotation shaft 22b.

The center link member 17 is coupled at one end thereof to the other end of the proximal side end link member 15 so as to be rotatable around a third rotation shaft 22c. The center link member 17 is also coupled at another end thereof to the other end of the distal side end link member 16 so as to be rotatable around a fourth rotation shaft 22d.

The first rotation shaft 22a shown in FIG. 1A is a rotation shaft around a central axis O1 of each revolute pair section T1 of the proximal end side link hub 12 and the proximal side end link member 15. The second rotation shaft 22b is a rotation shaft around a central axis O2 of a revolute pair section T2 of the distal end side link hub 13 and the distal side end link member 16. The third rotation shaft 22c shown in FIG. 1B is a rotation shaft (rotation shaft member) around a central axis O3 of each revolute pair section T3 of the proximal side end link member 15 and the center link member 17. The fourth rotation shaft 22d is a rotation shaft (rotation shaft member) around a central axis O4 of each revolute pair section T4 of the distal side end link member 16 and the center link member 17.

The parallel link mechanism 9 is structured by combining two spherical link mechanisms 9a and 9b. In the first spherical link mechanism 9a on the proximal end side, a central axis QA of the proximal end side link hub 12 and each of the central axes O1 and O3 of the first rotation shaft 22a and the third rotation shaft 22c intersect each other at a proximal end side spherical link center PA shown in FIG. 1A. In the second spherical link mechanism 9b on the distal end side, a central axis QB of the distal end side link hub 13 and each of the central axes O2 and O4 of the second rotation shaft 22b and the fourth rotation shaft 22d shown in FIG. 1B intersect each other at a distal end side spherical link center PB shown in FIG. 1A.

The distance between the center of the revolute pair section T1 of the proximal end side link hub 12 and the proximal side end link member 15 and the proximal end side spherical link center PA is the same. The distance between the center of the revolute pair section T3 of the proximal side end link member 15 and the center link member 17 shown in FIG. 1B and the proximal end side spherical link center PA is the same. Similarly, the distance between the center of the revolute pair section T2 of the distal end side link hub 13 and the distal side end link member 16 shown in FIG. 1A and the distal end side spherical link center PB is the same.

The distance between the center of the revolute pair section T4 of the distal side end link member 16 and the center link member 17 shown in FIG. 1B and the distal end side spherical link center PB is the same. In this example, the third and fourth rotation shafts 22c and 22d of the respective revolute pair sections T3 and T4 of the proximal and distal side end link members 15 and 16 and the center link member 17 have a certain cross angle (also referred to as "axis angle") γ, but may be parallel to each other. An arm angle which is an angle formed by the first rotation shaft 22a and the third rotation shaft 22c is specified as a determined angle.

Figure 2:
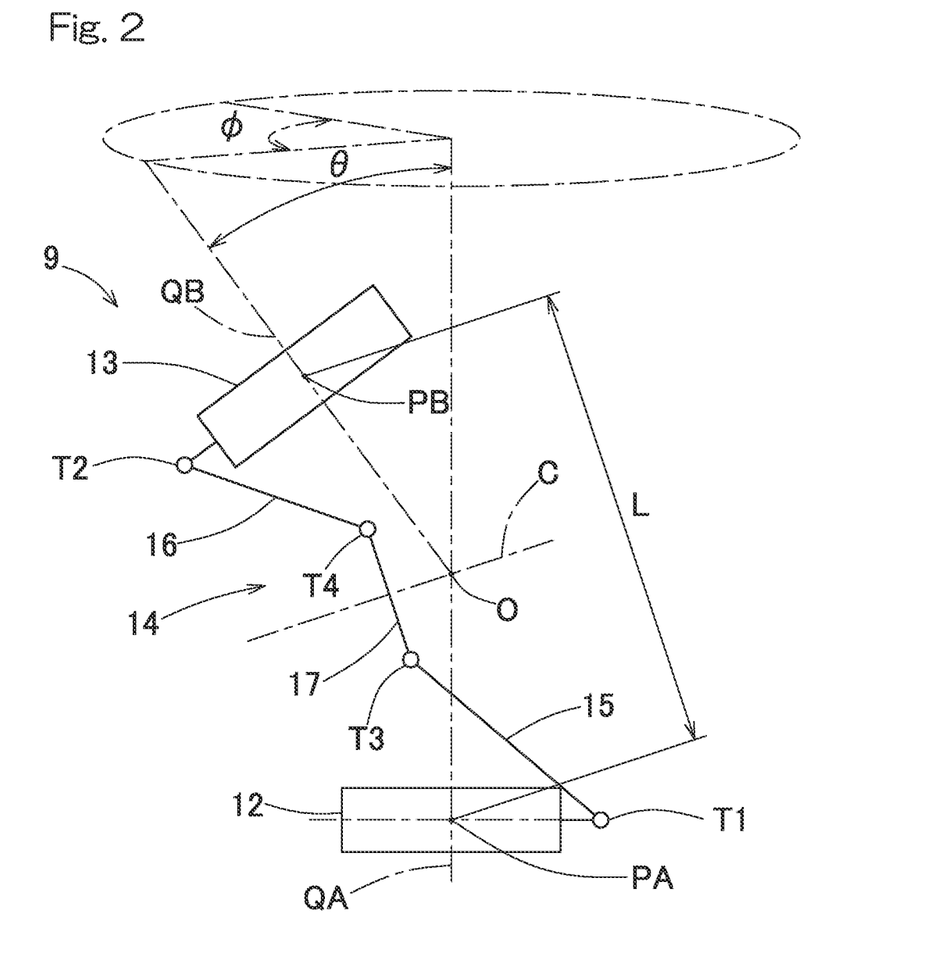
FIG. 2 is a diagram representing one link mechanism of the parallel link mechanism with straight lines.

The three link mechanisms 14 have a geometrically identical configuration. The geometrically identical configuration means that, as shown in FIG. 2, a geometric model depicted with straight lines representing the link members 15, 16, and 17, that is, a model depicted with the revolute pair sections T1, T3, T4, and T2 and straight lines connecting these revolute pair sections T1, T3, T4, and T2, represents a shape in which the proximal end side portion thereof and the distal end side portion thereof are symmetrical with each other with respect to the center portion of the center link member 17 in any posture. The revolute pair sections T1, T3, T4, and T2 are sometimes referred to as "each revolute pair section T1, etc." in the following description.

FIG. 2 is a diagram representing one link mechanism 14 with straight lines. The parallel link mechanism 9 of this embodiment is of a rotation symmetry type, and has a positional configuration in which the positional relationship between a proximal end side portion including the proximal end side link hub 12 and the proximal side end link member 15 and a distal end side portion including the distal end side link hub 13 and the distal side end link member 16 is in rotation symmetry relative to a center line C of the center link member 17.

The proximal end side link hub 12, the distal end side link hub 13, and the three link mechanisms 14 form a two-degrees-of-freedom mechanism in which the distal end side link hub 13 is rotatable about two mutually orthogonal axes, relative to the proximal end side link hub 12. In other words, the proximal end side link hub 12, the distal end side link hub 13, and the three link mechanisms 14 form a mechanism that allows the distal end side link hub 13 to rotate with two degrees of freedom to change its posture, relative to the proximal end side link hub 12. This two-degrees-of-freedom mechanism is compact in size, and also, can achieve a wide range of movement for the distal end side link hub 13 relative to the proximal end side link hub 12.

A vertical angle at which the central axis QB of the distal end side link hub 13 is inclined relative to the central axis QA of the proximal end side link hub 12 is referred to as bending angle θ. The maximum value of the bending angle θ is referred to as maximum bending angle θ max. In addition, a turning angle φ of the distal end side link hub 13 relative to the proximal end side link hub 12 can be set in the range of 0° to 360°. The turning angle φ is a horizontal angle at which the central axis QB of the distal end side link hub 13 is inclined relative to the central axis QA of the proximal end side link hub 12.

The posture of the distal end side link hub 13 relative to the proximal end side link hub 12 is changed with a point of intersection O of the central axis QA of the proximal end side link hub 12 and the central axis QB of the distal end side link hub 13 as a rotation center. FIG. 1B shows a state where the central axis QA of the proximal end side link hub 12 and the central axis QB of the distal end side link hub 13 are on the same line, and FIG. 2 shows a state where the central axis QB takes a certain operating angle (bending angle) with respect to the central axis QA. Even if the posture of the distal end side link hub 13 relative to the proximal end side link hub 12 is changed, a distance L between the proximal and distal end side spherical link centers PA and PB does not change.

Figure 3:
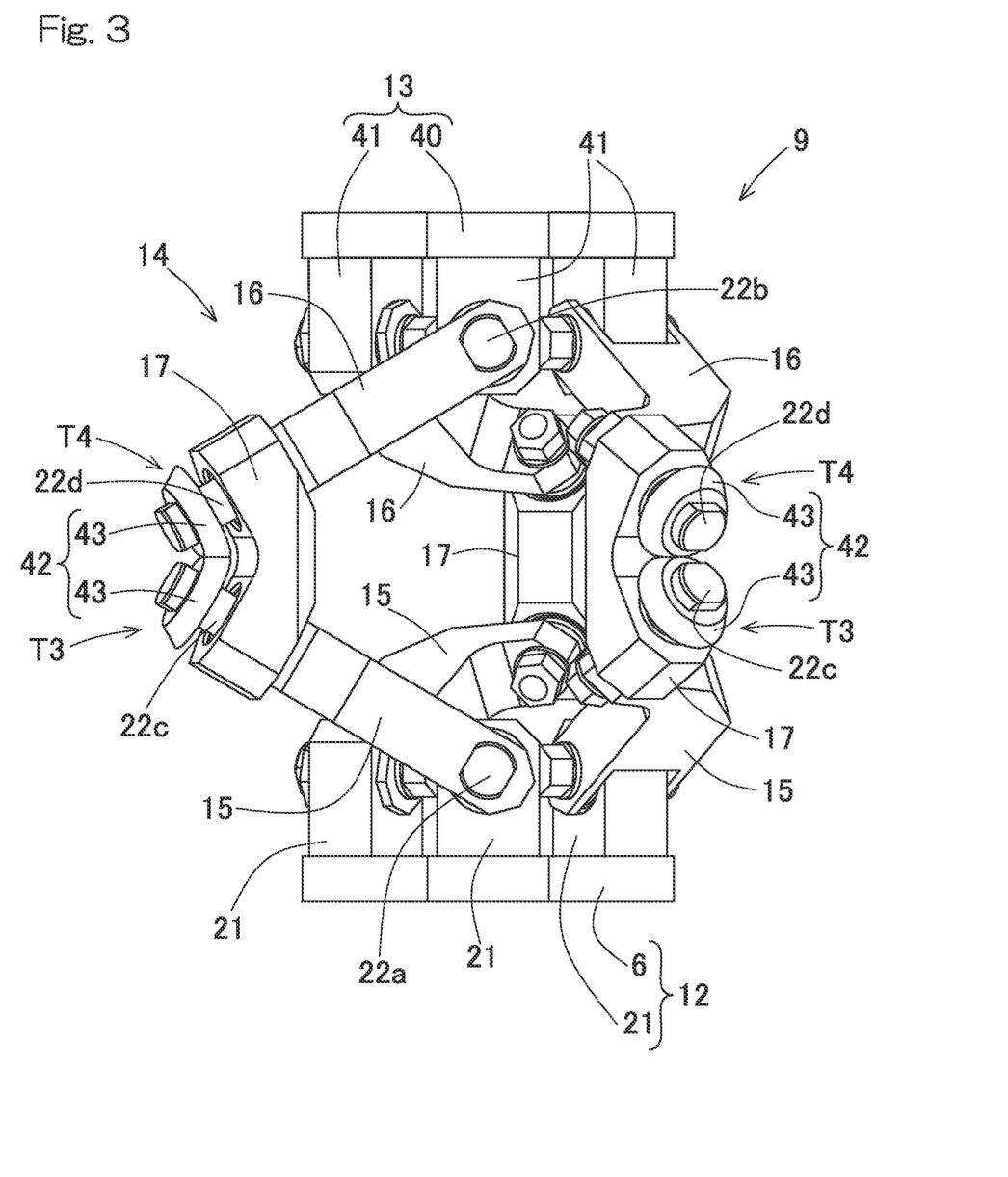
FIG. 3 is a perspective view of the parallel link mechanism.
Figure 4:
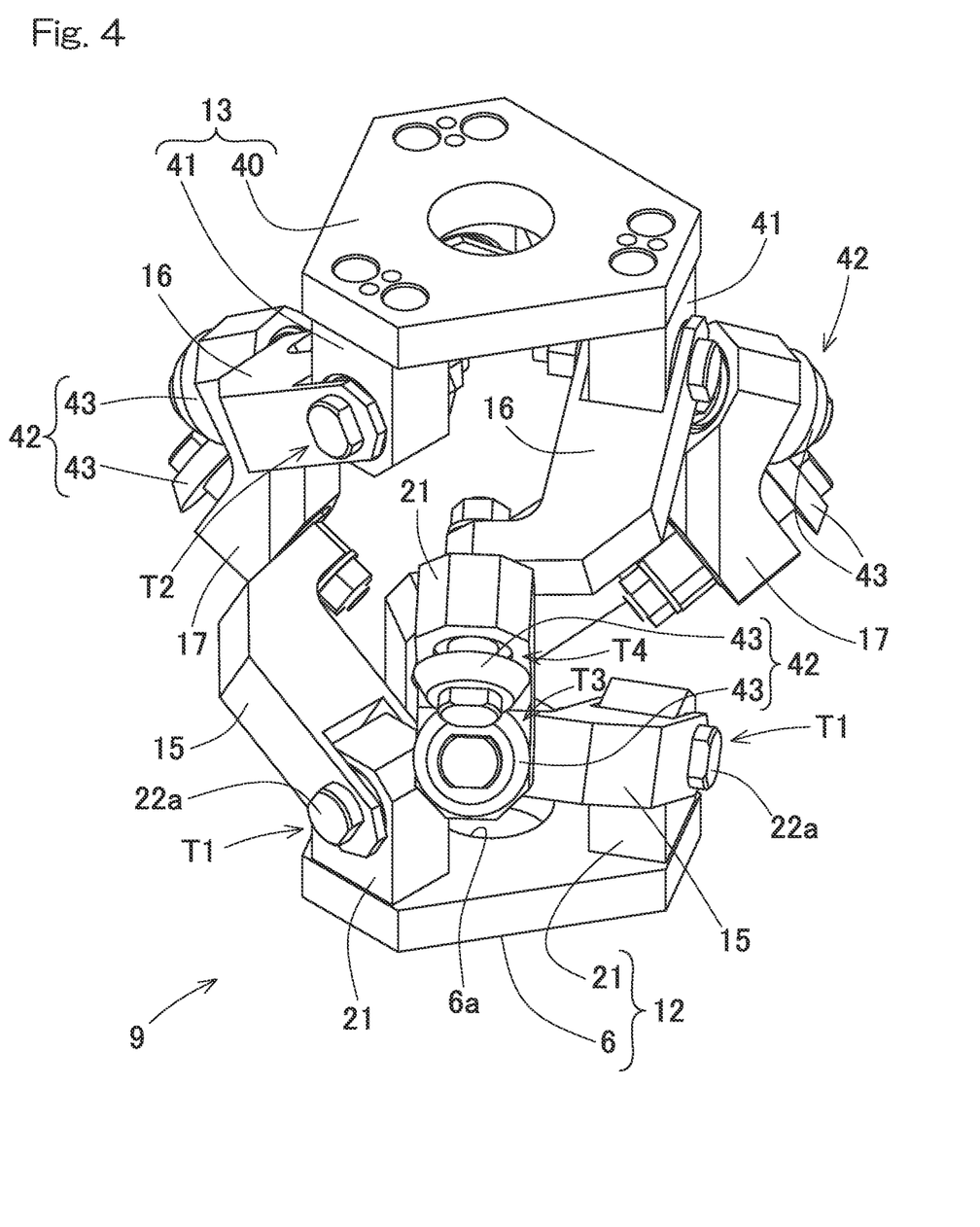
FIG. 4 is a perspective view of the parallel link mechanism as viewed at a different angle.

The three link mechanisms 14 shown in FIG. 3 are placed so as to be spaced equidistantly from each other by 120 degrees in the circumferential direction, but do not necessarily need to be placed in such a manner. The proximal end side link hub 12 includes a flat plate-shaped proximal end member 6 and three rotation shaft coupling members 21 provided so as to be integrated with the proximal end member 6. As shown in FIG. 4, the proximal end member 6 has a circular through hole 6a in a center portion thereof, and the three rotation shaft coupling members 21 are placed equidistantly in the circumferential direction around the through hole 6a.

A rolling bearing (not shown) is provided in each revolute pair section T1, etc., as a means for resisting rotation of the revolute pair section. In the revolute pair section T1 of the proximal end side link hub 12 and the proximal side end link member 15, the first rotation shaft 22a is rotatably coupled to each rotation shaft coupling member 21 via the rolling bearing. The one end of the proximal side end link member 15 is coupled to the first rotation shaft 22a, and the first rotation shaft 22a and the proximal side end link member 15 rotate together.

As shown in FIG. 1A, the first rotation shaft 22a is rotatably supported by the rotation shaft coupling member 21 via the rolling bearing at an axially intermediate portion thereof. The rolling bearing is fixed in a state where the outer circumference of an outer ring thereof is fitted into a radially inner groove provided in the rotation shaft coupling member 21. The installation method for the rolling bearings provided in the other revolute pair sections T2, T3, and T4 (FIG. 1B) is substantially the same as above.

As shown in FIG. 1B, the distal end side link hub 13 includes a flat plate-shaped distal end member 40 and three rotation shaft coupling members 41 provided equidistantly in the circumferential direction on a bottom surface of the distal end member 40. The center of the circumference on which each rotation shaft coupling member 41 is placed is located on the central axis QB of the distal end side link hub 13. The second rotation shaft 22b whose axis intersects the central axis QB of the distal end side link hub 13 is rotatably coupled to each rotation shaft coupling member 41. The one end of the distal side end link member 16 is coupled to the second rotation shaft 22b. The fourth rotation shaft 22d is rotatably coupled to the other end of the center link member 17 and is coupled to the other end of the distal side end link member 16.

<Rotation Transmission Mechanism>

Each of the three link mechanisms 14 shown in FIG. 3 includes a rotation transmission mechanism 42 provided at both revolute pair sections T3 and T4 including the proximal and distal side end link members 15 and 16 and both ends of the center link member 17. The rotation transmission mechanism 42 allows the rotation of either one revolute pair section T3 (T4) to rotate the other revolute pair section T4 (T3) in the opposite direction with respect to the one revolute pair section T3 (T4), that is, rotate in reverse, by the same amount of rotation.

Figure 5:
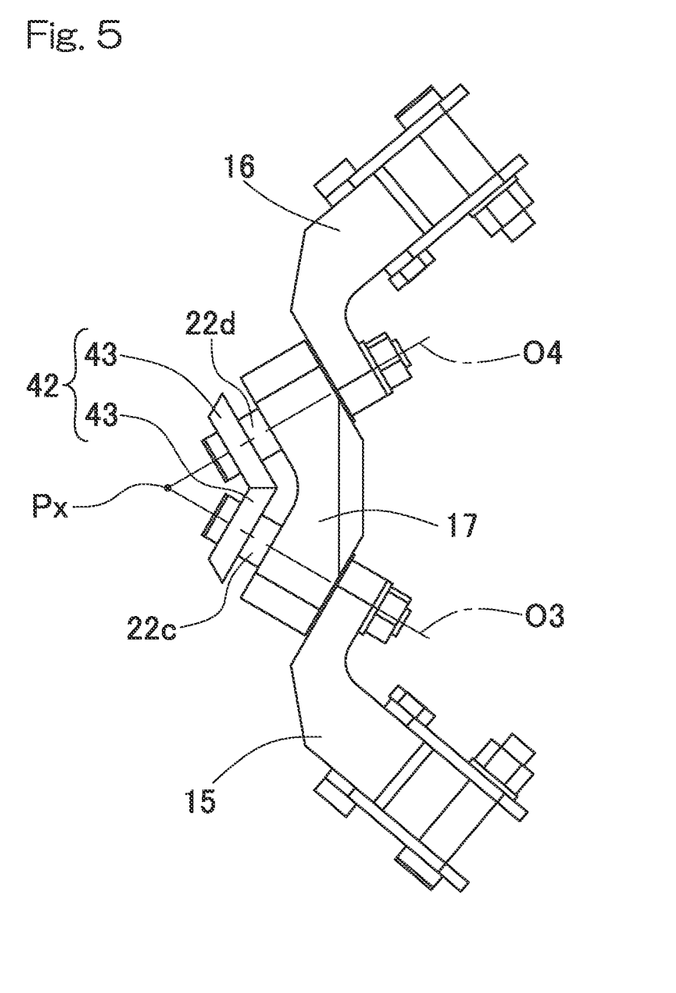
FIG. 5 is a partially enlarged view showing a main part of the parallel link mechanism.

As shown in FIG. 5, as the rotation transmission mechanism 42 includes gears provided at the third rotation shaft 22c and the fourth rotation shaft 22d, respectively, and the gears rotate around the rotation shafts 22c and 22d and mesh with each other. These gears are, for example, bevel gears 43. The pair of bevel gears 43, 43 which mesh with each other, rotate in accordance with the operating angles of the proximal and distal side end link members 15 and 16. One bevel gear 43 is fixed to the other end of the proximal side end link member 15 together with the third rotation shaft 22c. The one bevel gear 43 is also coupled to the one end of the center link member 17 so as to be rotatable around the third rotation shaft 22c.

The other bevel gear 43 is fixed to the other end of the distal side end link member 16 together with the fourth rotation shaft 22d. The other bevel gear 43 is also coupled to the other end of the center link member 17 so as to be rotatable around the fourth rotation shaft 22d. The one bevel gear 43 and the other bevel gear 43 in the present embodiment are gears having the same shape. The pair of bevel gears 43, 43 are placed adjacent to each other in the vicinity of a point of intersection Px of the third rotation shaft 22c and the fourth rotation shaft 22d.

<Function Effects>

In the parallel link mechanism 9 in FIG. 3 described above, the proximal end side link hub 12, the distal end side link hub 13, and the three or more link mechanisms 14 form a two-degrees-of-freedom mechanism in which the distal end side link hub 13 is rotatable about two mutually orthogonal axes, relative to the proximal end side link hub 12. In other words, the proximal end side link hub 12, the distal end side link hub 13, and the three or more link mechanisms 14 form a mechanism that allows the distal end side link hub 13 to rotate with two degrees of freedom to change its posture, relative to the proximal end side link hub 12. This two-degrees-of-freedom mechanism is compact in size, and also, can achieve a wide range of movement for the distal end side link hub 13 relative to the proximal end side link hub 12.

The parallel link mechanism 9 includes the rotation transmission mechanism 42 at both revolute pair sections T3 and T4, and the rotation transmission mechanism 42 allows the rotation of the one revolute pair section T3 (T4) to rotate the other revolute pair section T4 (T3) in reverse. Therefore, the amount of rotation of the other revolute pair section T4 (T3) is uniquely determined by the rotation of the one revolute pair section T3 (T4), which satisfies a rotation restriction condition for the parallel link mechanism 9. Thus, deformation such as torsion of the parallel link mechanism 9 is suppressed, and the rigidity of the entire mechanism is improved as compared to the parallel link mechanism of the conventional art in which the rotation restriction condition is not satisfied.

The rotation transmission mechanism 42 rotates the other revolute pair section T4 (T3) in reverse with respect to the one revolute pair section T3 (T4) by the same amount of rotation. Therefore, the design and the structure of the rotation transmission mechanism 42 can be simplified, and the manufacturing cost of the entire parallel link mechanism can also be reduced. For example, even if the machining accuracy of the components of the parallel link mechanism 9 is low, or even if the rigidity of the rolling bearing provided in each revolute pair section T1, etc., is low, the rotation restriction condition for the parallel link mechanism 9 is satisfied by the rotation transmission mechanism 42, and therefore, the manufacturing cost can be reduced.

The rotation transmission mechanism 42 includes the "bevel gears 43" at the third rotation shaft 22c of the revolute pair section T3 of the proximal side end link member 15 and the center link member 17 and the fourth rotation shaft 22d of the revolute pair section T4 of the distal side end link member 16 and the center link member 17, respectively, and the bevel gears 43 rotate around the respective rotation shafts 22c and 22d and mesh with each other Therefore, the rotation of the one revolute pair section T3 (T4) can be accurately transmitted to the other revolute pair section T4 (T3). The "bevel gears 43", which are provided at the respective rotation shafts 22c and 22d, have the same shape. Therefore, components can be used for either, and the manufacturing cost of the rotation transmission mechanism 42 can be reduced. The pair of bevel gears 43, 43 are placed adjacent to each other in the vicinity of the point of intersection Px (FIG. 5) of the third rotation shaft 22c and the fourth rotation shaft 22d. Therefore, the bevel gears 43, 43 themselves can be reduced in size, which contributes to downsizing the parallel link mechanism 9.

In the following description, parts corresponding to the matters described in the preceding embodiment are designated by the same reference numerals, and the redundant description thereof is omitted. When only a part of a configuration is described, the remaining part of the configuration is the same as that described in the preceding embodiment, unless otherwise specified. The same advantageous effects are achieved by the same configuration. A combination of parts that are specifically described in respective embodiments can be implemented, and, further, embodiments may be partially combined unless such combination causes any problem.

Figure 6A:
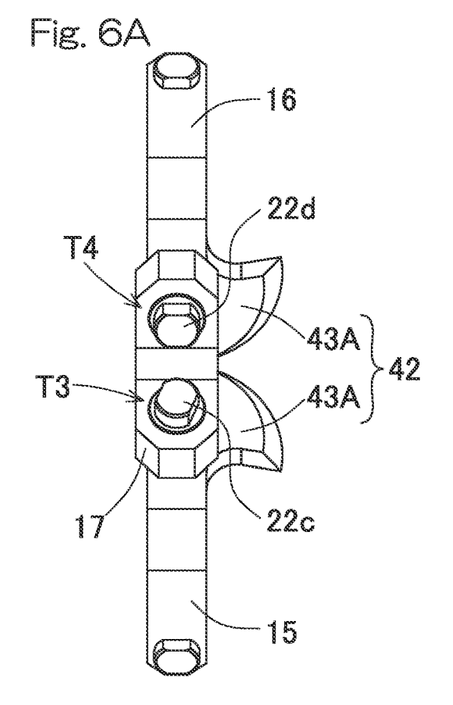
FIG. 6A is a partially enlarged view showing a main part of a parallel link mechanism according to a second embodiment of the present invention.
Figure 6B:
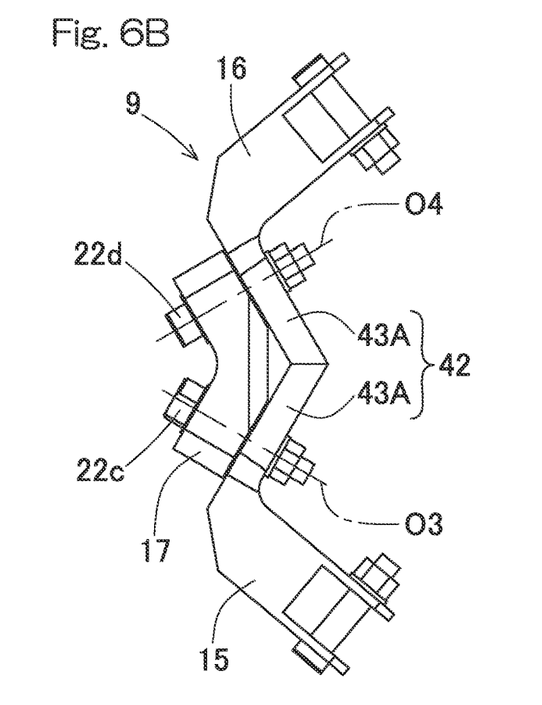
FIG. 6B is a partially enlarged front view of the parallel link mechanism.
Figure 6C:
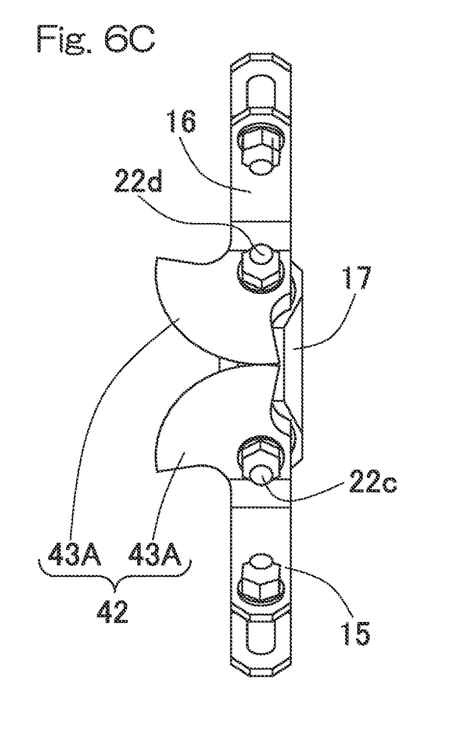
FIG. 6C is a partially enlarged side view of the parallel link mechanism.

Second Embodiment: FIG. 6A to FIG. 6C

In a second embodiment, as shown in FIG. 6A, the rotation transmission mechanism 42 includes bevel gear portions 43A, 43A integrated with the proximal and distal side end link members 15 and 16, respectively. That is, one bevel gear portion 43A, which is a sector gear, is integrally provided at the other end of the proximal side end link member 15, and the other bevel gear portion 43A, which is a sector gear, is integrally provided at the other end of the distal side end link member 16. The pair of bevel gear portions 43A, 43A mesh with each other as shown in FIG. 6B.

As shown in FIG. 6C, the pair of bevel gear portions 43A, 43A are formed at least over the angles of the operating ranges of the proximal and distal side end link members 15 and 16, and mesh with each other. The bevel gear portions 43A, 43A are rotatable around the third and fourth rotation shafts 22c and 22c. As shown in FIG. 6B, the pair of bevel gear portions 43A, 43A are provided on the internal space side of the parallel link mechanism 9. The other configuration is the same as in the above-described embodiment.

With this configuration, the bevel gear portions 43A, 43A are integrated with the proximal and distal side end link members 15 and 16, respectively. Therefore, the number of components of the entire parallel link mechanism can be reduced as compared to the above-described first embodiment. Accordingly, the structure of the parallel link mechanism 9 can be simplified and the cost of the parallel link mechanism 9 can be reduced. Since the bevel gear portions 43A, 43A are integrated with the respective end link members 15 and 16, this can contribute to improving the rigidity of the entire mechanism. Since the pair of bevel gear portions 43A, 43A are placed on the internal space side of the parallel link mechanism 9, further downsizing can be achieved as compared to the above-described first embodiment. The bevel gear portions 43A, 43A may be fixed to the proximal and distal side end link members 15 and 16 by means of welding, bolts, or the like.

Figure 7A:
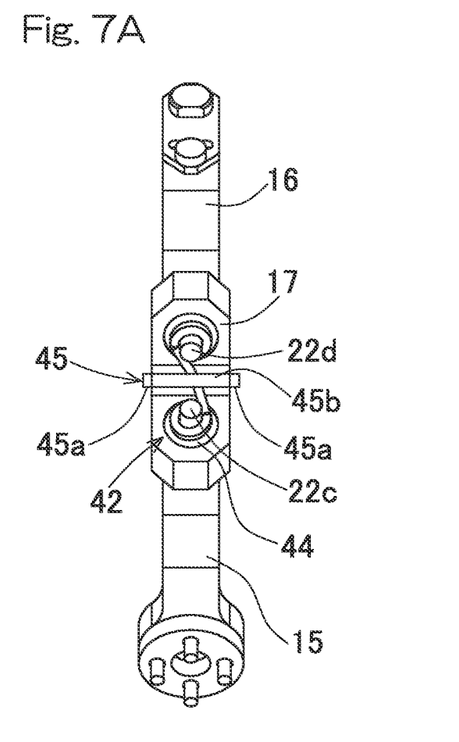
FIG. 7A is a partially enlarged view showing a main part of a parallel link mechanism according to a third embodiment of the present invention.
Figure 7B:
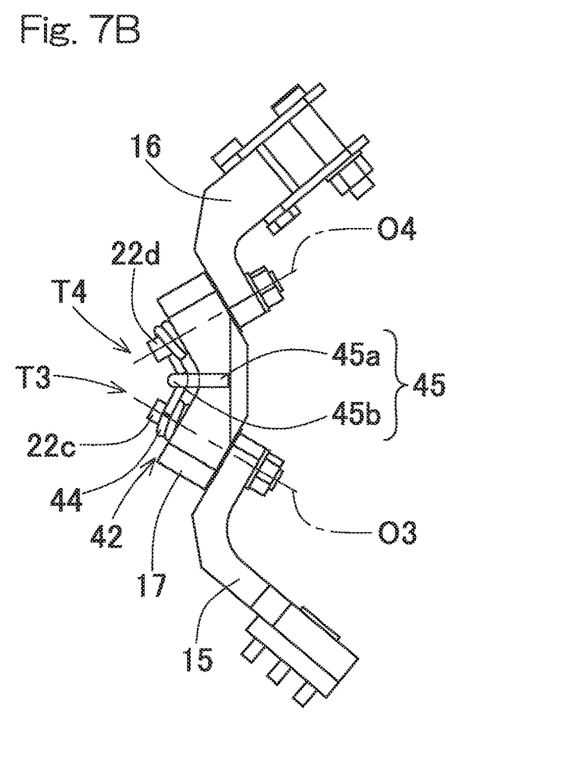
FIG. 7B is a partially enlarged front view of the parallel link mechanism.
Figure 8:
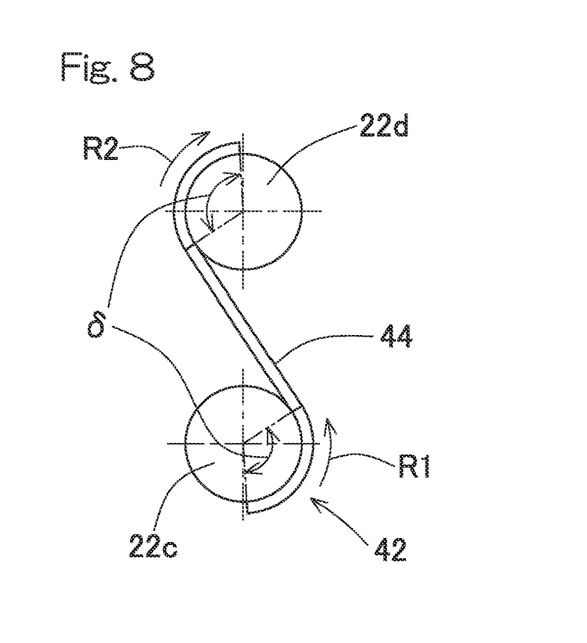
FIG. 8 is a diagram showing a state where both revolute pair sections of the parallel link mechanism are connected by a wire body.

Third Embodiment: FIG. 7A to FIG. 8

In a third embodiment, as shown in FIG. 7A, one end of a wire rope 44, which is a wire body, is wound around the third rotation shaft (rotation shaft member) 22c, and the other end of the wire rope 44 is wound around the fourth rotation shaft (rotation shaft member) 22d. As shown in FIG. 7B, the third and fourth rotation shafts 22c and 22d are connected to each other by the wire rope 44. Specifically, the wire rope 44 is mounted such that one end portion of the wire rope 44 is fixed to the third rotation shaft 22c by means of welding or the like and the one end of the wire rope 44 is wound around the circumference of the third rotation shaft 22c at least over the operating range of the revolute pair section T4 of the center link member 17.

The wire rope 44 is mounted such that another end portion of the wire rope 44 is fixed to the fourth rotation shaft 22d by means of welding or the like, and the other end of the wire rope 44 is wound around the circumference of the fourth rotation shaft 22d at least over the operating range of the revolute pair section T3 of the center link member 17. The operating range of the center link member 17 is determined by the design of each spherical link mechanism. In FIG. 8, the wire rope 44 is wound around the respective rotation shafts 22c and 22d by operating angles δ of both revolute pair sections T3 and T4 of the center link member 17.

As the direction in which the wire rope 44 is wound, a direction R2 of winding around the fourth rotation shaft 22d is set to be opposite to a direction R1 of winding around the third rotation shaft 22c. In addition, in order to make the amounts of winding and unwinding of the wire rope 44 the same, the shaft portions of the respective rotation shafts 22c and 22d, around which the wire rope 44 is wound, are made to have the same diameter.

With this configuration, when one rotation shaft 22c (22d) is rotated by the rotation of the one revolute pair section T3 (T4), the wire rope 44 is wound or unwound along the circumference of the one rotation shaft 22c (22d) by the operating angle. Since the wire rope 44 is wound around the third and fourth rotation shafts 22c and 22d in opposite directions, when a part of the wire rope 44 is wound, for example, along the circumference of the one rotation shaft 22c (22d) as described above, a rotational force in a direction opposite to that of the one rotation shaft 22c (22d) is given to the other rotation shaft 22d (22c) by the tension of the wire rope 44. Therefore, for example, by providing the wire rope 44, which is a wire body, to an existing parallel link mechanism, the rotation of one revolute pair section can be accurately transmitted to another revolute pair section.

As shown in FIG. 7A, the rotation transmission mechanism 42 may include a guide 45 for winding the wire rope 44 perpendicularly to the respective rotation axes of the respective rotation shafts 22c and 22d. The guide 45 is provided to the center link member 17. The guide 45 is formed, for example, in a U-shape by guide fixing portions 45a, 45a which are fixed to both side portions of the center link member 17 and a guide body portion 45b which is provided so as to extend between end portions of these guide fixing portions 45a, 45a.

By guiding the wire rope 44 while bringing the wire rope 44 into contact with a longitudinally intermediate portion, facing the center link member 17, of the guide body portion 45b as shown in FIG. 7B, the wire rope 44 is wound perpendicularly as described above. The guide 45 may include a rotation structure (not shown) for reducing frictional resistance, at the portion that is in contact with the wire rope 44. In the case of being provided with this rotation structure, the durability of the rotation transmission mechanism 42 can be increased, and the maintenance period can be extended. The guide 45 include a tension adjustment mechanism (not shown) for adjusting the tension of the wire rope 44. In the case of being provided with this tension adjustment mechanism, the rotation of the one revolute pair section T3 (T4) can be accurately transmitted to the other revolute pair section T4 (T3) over a long period of time.

Other Embodiments

In the case where the number of link mechanisms 14 is four or more, each of at least three link mechanisms may include a rotation transmission mechanism at both revolute pair sections including the proximal and distal side end link members and both ends of the center link member. As the rotation transmission mechanism 42, the pair of gears that mesh with each other may be non-identical in shape. The rotation transmission mechanism 42 may be gears on two parallel shafts that mesh with each other. As the wire body, a belt, a chain, or the like may be used.

Figure 9:
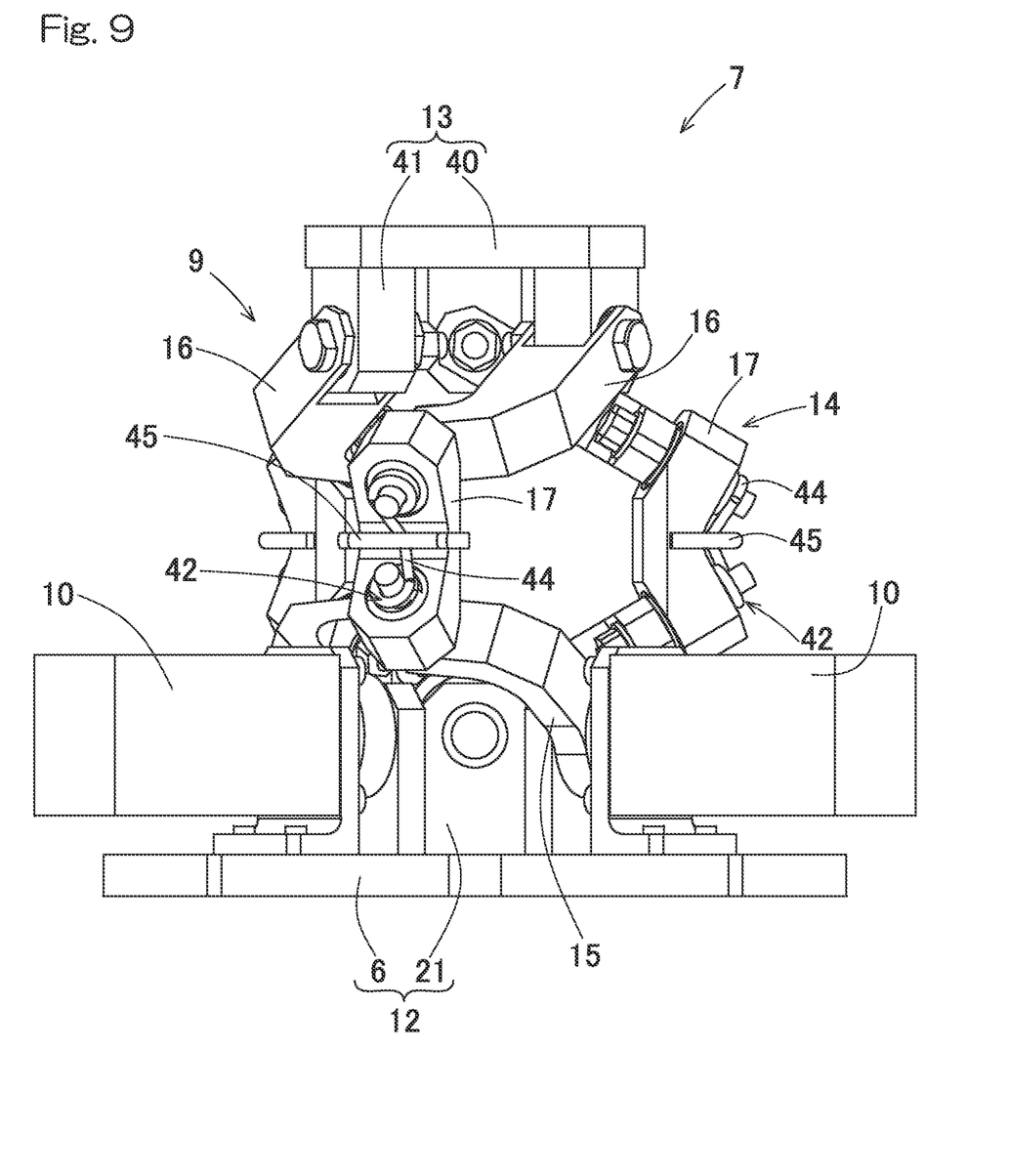
FIG. 9 is a perspective view of a link actuating device including the parallel link mechanism according to the third embodiment of the present invention.
Figure 10:
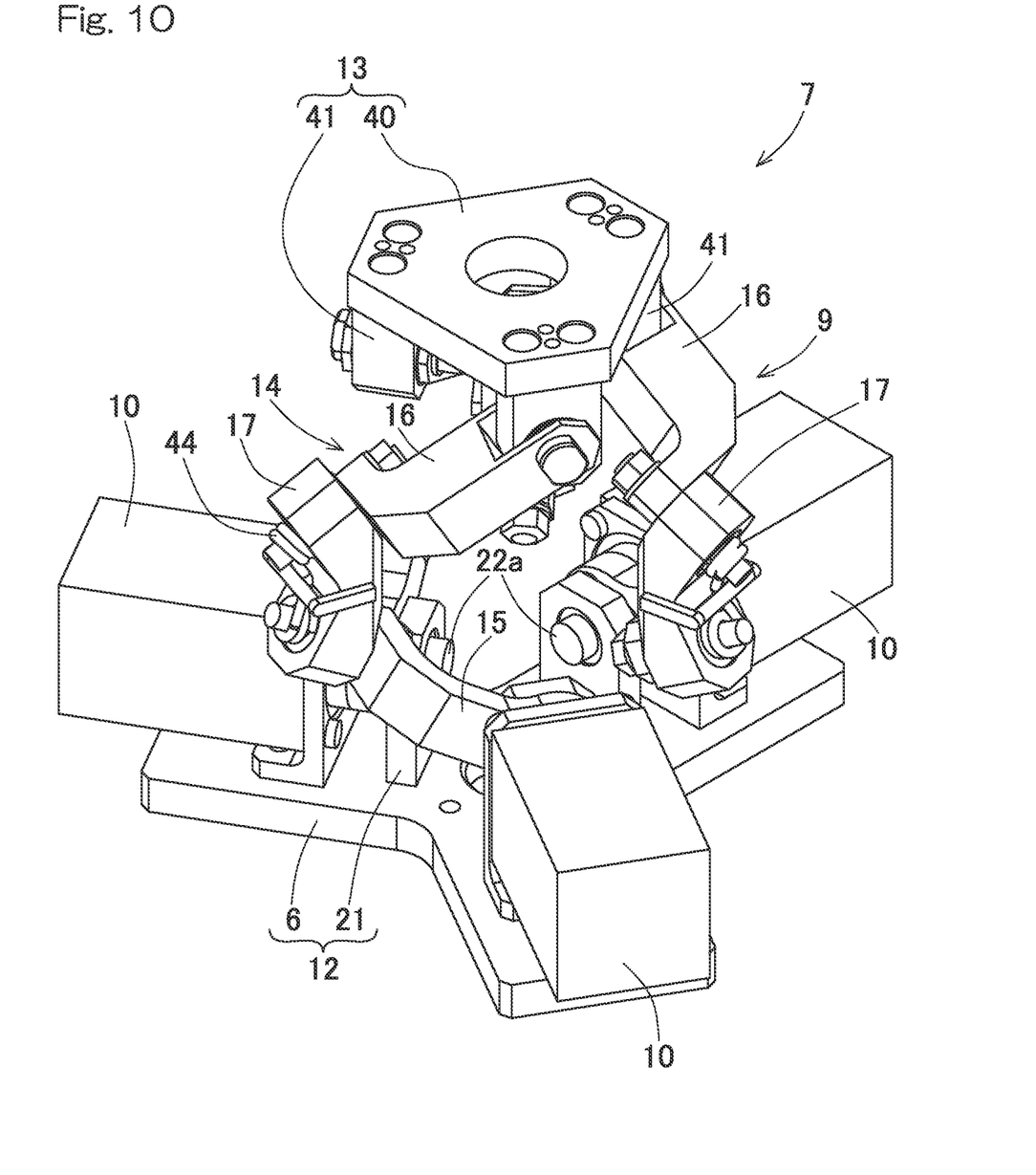
FIG. 10 is a perspective view of the link actuating device as viewed at a different angle.

<Link Actuating Device: FIG. 9 and FIG. 10>

Figure 11:
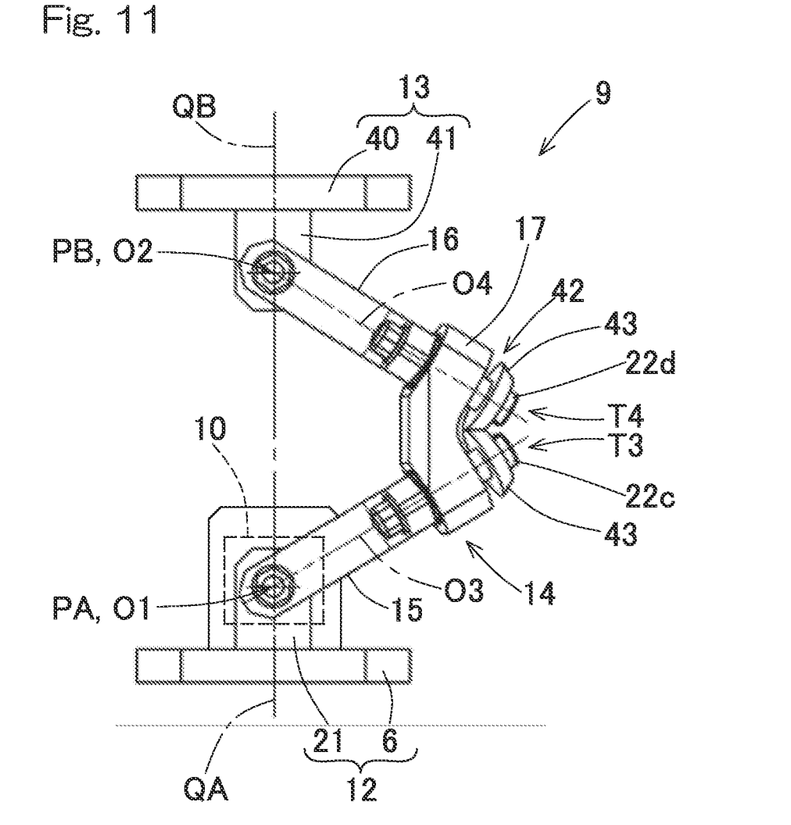
FIG. 11 is a front view of a simplified model of a link actuating device including the parallel link mechanism according to the first embodiment of the present invention in which two link mechanisms are omitted.

A link actuating device 7 shown in FIG. 9 includes the parallel link mechanism 9 according to the third embodiment described above, and posture control actuators 10 which arbitrarily control the posture of the distal end side link hub 13 of the parallel link mechanism 9. Instead of the above-described parallel link mechanism 9, the parallel link mechanism 9 (FIG. 1B) of the first embodiment or the parallel link mechanism 9 (FIG. 6B) of the second embodiment may be applied to the link actuating device 7. FIG. 11 shows a simplified model of the link actuating device 7 including the parallel link mechanism 9 of the first embodiment in which two link mechanisms are omitted.

<Posture Control Actuator>

In the example of FIG. 10, posture control actuators 10 are provided to all of the three link mechanisms 14. Each posture control actuator 10 is a rotary actuator including a speed-reducing mechanism (not shown), and is installed on the surface of the proximal end member 6 of the proximal end side link hub 12, coaxially with the first rotation shaft 22a. If posture control actuators 10 are provided to at least two of the three link mechanisms 14 shown in FIG. 10, the posture of the distal end side link hub 13 relative to the proximal end side link hub 12 can be determined.

The link actuating device 7 actuates the parallel link mechanism 9 by rotationally driving each posture control actuator 10. Specifically, when each posture control actuator 10 is rotationally driven, the rotation thereof is transmitted to the first rotation shaft 22a via the speed-reducing mechanism while the speed of the rotation is reduced. Accordingly, the posture of the distal end side link hub 13 relative to the proximal end side link hub 12 is arbitrarily changed. An end effector (not shown) is attached to the distal end member 40 of the distal end side link hub 13. Examples of the end effector include a hand including a gripper, a nozzle for cleaning, a dispenser, a welding torch, an image processing device, etc.

The present invention is not limited to the above-described embodiments, and various additions, changes, or deletions can be made without departing from the gist of the present invention. Therefore, these are construed as included within the scope of the present invention.

REFERENCE NUMERALS

7 . . . link actuating device
9 . . . parallel link mechanism
9a, 9b . . . spherical link mechanism
10 . . . posture control actuator
12 . . . proximal end side link hub
13 . . . distal end side link hub
14 . . . link mechanism
15 . . . proximal side end link member
16 . . . distal side end link member
17 . . . center link member
22c . . . third rotation shaft
22d . . . fourth rotation shaft
42 . . . rotation transmission mechanism
43 . . . bevel gear (gear)
43A . . . bevel gear portion (gear)
44 . . . wire rope (wire body)

What is claimed is:

1. A parallel link mechanism comprising:
a proximal end side link hub;
a distal end side link hub; and
three or more link mechanisms which couple the distal end side link hub to the proximal end side link hub such that a posture of the distal end side link hub can be changed relative to the proximal end side link hub, wherein
each of the link mechanisms is a spherical link mechanism including:
a proximal side end link member rotatably coupled at one end thereof to the proximal end side link hub;
a distal side end link member rotatably coupled at one end thereof to the distal end side link hub; and
a center link member rotatably coupled at both ends thereof to other ends of the proximal side end link member and the distal side end link member via a revolute pair which is composed of one revolute pair section and the other revolute pair section, respectively,
further comprising:
a rotation transmission mechanism which is provided in the revolute pair and allows rotation of the one revolute pair section to rotate the other revolute pair section in reverse with respect to the one revolute pair section.

2. The parallel link mechanism as claimed in claim 1, wherein the rotation transmission mechanism rotates the other revolute pair section in reverse with respect to the one revolute pair section by the same amount of rotation.

3. A parallel link mechanism comprising:
a proximal end side link hub;
a distal end side link hub; and
three or more link mechanisms which couple the distal end side link hub to the proximal end side link hub such that a posture of the distal end side link hub can be changed relative to the proximal end side link hub, wherein
each of the link mechanisms is a spherical link mechanism including:
a proximal side end link member rotatably coupled at one end thereof to the proximal end side link hub;
a distal side end link member rotatably coupled at one end thereof to the distal end side link hub; and
a center link member rotatably coupled at both ends thereof to other ends of the proximal side end link member and the distal side end link member via a revolute pair which is composed of one revolute pair section and the other revolute pair section, respectively,
further comprising:
a rotation transmission mechanism which allows rotation of the one revolute pair section to rotate the other revolute pair section in reverse with respect to the one revolute pair section,
wherein the rotation transmission mechanism includes gears provided at a rotation shaft of the one revolute pair section of the proximal side end link member and the center link member and a rotation shaft of the other revolute pair section of the distal side end link member and the center link member, the gears rotating around the rotation shafts and meshing with each other.

4. The parallel link mechanism as claimed in claim 3, wherein the gears are bevel gears.

5. The parallel link mechanism as claimed in claim 3, wherein the gears provided at the respective rotation shafts are gears having the same shape.

6. A parallel link mechanism comprising:
a proximal end side link hub;
a distal end side link hub; and three or more link mechanisms which couple the distal end side link hub to the proximal end side link hub such that a posture of the distal end side link hub can be changed relative to the proximal end side link hub, wherein each of the link mechanisms is a spherical link mechanism including:
- a proximal side end link member rotatably coupled at one end thereof to the proximal end side link hub;
- a distal side end link member rotatably coupled at one end thereof to the distal end side link hub; and
- a center link member rotatably coupled at both ends thereof to other ends of the proximal side end link member and the distal side end link member via a revolute pair which is composed of one revolute pair section and the other revolute pair section, respectively, further comprising:
- a rotation transmission mechanism which allows rotation of the one revolute pair section to rotate the other revolute pair section in reverse with respect to the one revolute pair section, wherein
- the rotation transmission mechanism includes a wire body, one of which is wound around a rotation shaft member having a central axis which is a rotation axis of the revolute pair of the proximal side end link member and the center link member,
- another end of the wire body is wound in a direction opposite to that of the one end around a rotation shaft member having a central axis which is a rotation axis of the revolute pair of the distal side end link member and the center link member, and
- the rotation shaft members are connected to each other by the wire body.

7. A link actuating device comprising:

the parallel link mechanism as claimed in claim 1; and a posture control actuator provided at each of two or more link mechanisms of the three or more link mechanisms and configured to arbitrarily control the posture of the distal end side link hub.

\* \* \* \* \*